United States Patent [19]

Okamura et al.

[11] 3,943,291

[45] Mar. 9, 1976

[54] AUTOMATIC TELEPHONE ANSWERING APPARATUS

[75] Inventors: Akira Okamura; Shizuo Ando, both of Tokorozawa, Japan

[73] Assignee: Pioneer Electronic Corporation, Tokyo, Japan

[22] Filed: Sept. 9, 1974

[21] Appl. No.: 504,219

[30] Foreign Application Priority Data
Sept. 10, 1973   Japan............................ 48-101883

[52] U.S. Cl. ................................ 179/6 E; 179/6 R
[51] Int. Cl.² .......................................... H04M 1/64
[58] Field of Search.................. 179/6 R, 6 AC, 6 E

[56] References Cited
UNITED STATES PATENTS

| | | |
|---|---|---|
| 2,773,123 | 12/1956 | Handschin............................ 179/6 E |
| 2,927,964 | 3/1960 | Zimmermann....................... 179/6 R |
| 3,133,992 | 5/1964 | Dickman............................. 179/6 E |
| 3,136,856 | 6/1964 | Zimmermann....................... 179/6 E |
| 3,557,312 | 1/1971 | Vogelman et al. ................... 179/6 E |
| 3,842,209 | 10/1974 | Foresta et al. ....................... 179/6 E |

*Primary Examiner*—Vincent P. Canney
*Attorney, Agent, or Firm*—Sughrue, Rothwell, Mion & Zinn

[57] ABSTRACT

A remote-controlled automatic telephone answering apparatus of the type wherein the owner of the apparatus applies a control signal from a remote telephone substation in order to have recorded messages played back to him over the telephone line. If the owner should hang up his receiver during the playback of the messages, a hang-up detector and associated logic circuit detect the resulting disconnection and produce a signal for immediately releasing the line to return it to a non-busy state.

2 Claims, 1 Drawing Figure

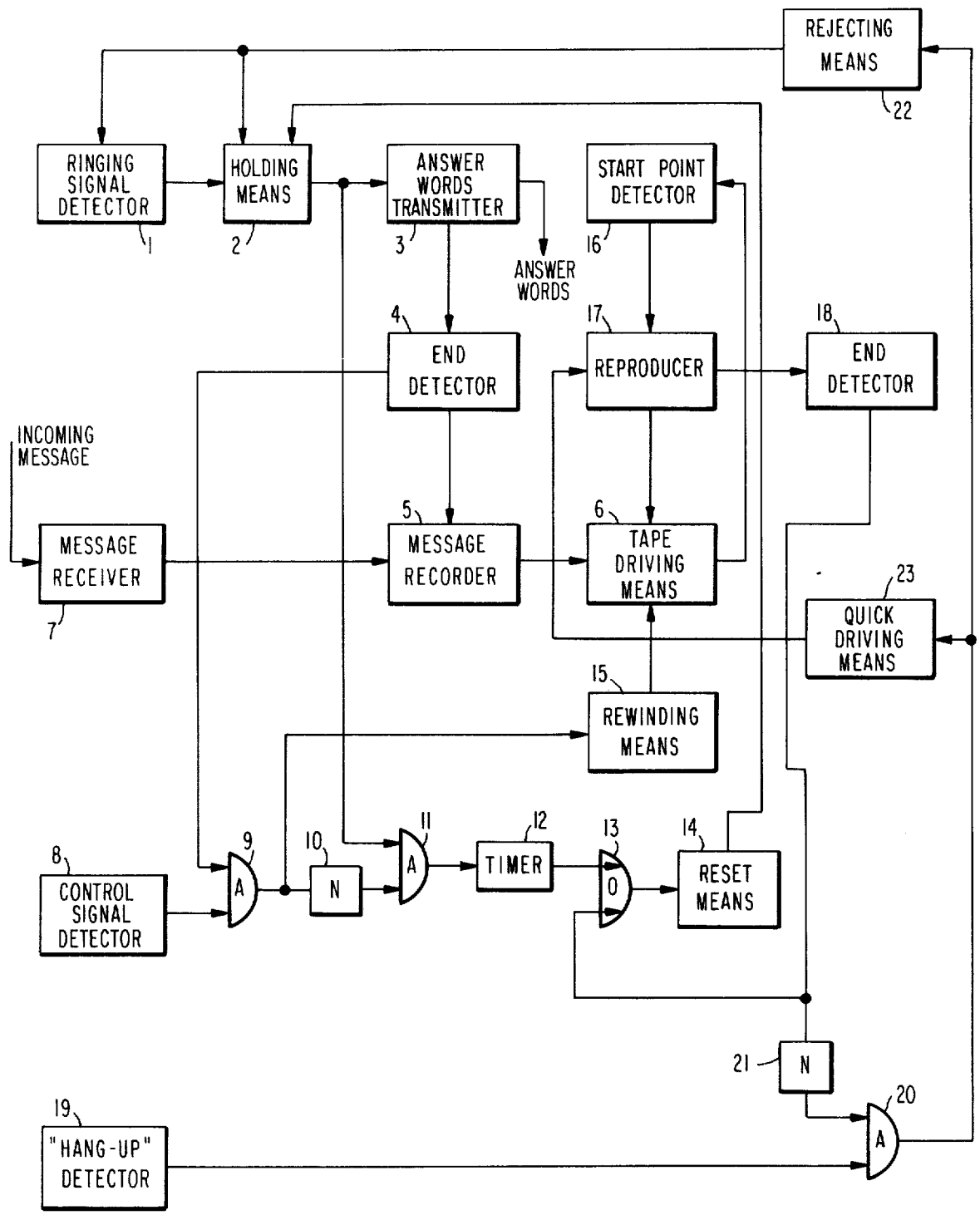

AUTOMATIC TELEPHONE ANSWERING APPARATUS

BACKGROUND OF THE INVENTION

1. Field of the Invention

The present invention relates to an automatic telephone answering apparatus which does not require any unnecessary holding of the telephone line in a busy state.

2. Description of the Prior Art

Remote-controlled telephone answering apparatus is well known in the art, wherein the apparatus reproduces and transmits previously recorded incoming messages from a number of callers in response to a remote control signal sent from the owner of the apparatus through the telephone line.

While the apparatus is reproducing and transmitting the recorded messages via the telephone line, the line is sometimes blocked either by the owner's hang-up of his remote receiver for other more urgent business, for example, or by a malfunction.

In such a situation, the conventional prior art apparatus will continue the message reproducing operation and maintain the telephone line in a busy state, because it cannot stop its operation until all the recorded messages have been reproduced, and the apparatus comes to an end position.

SUMMARY OF THE INVENTION

Accordingly, one object of the present invention is to eliminate the above mentioned inconvenience of the conventional apparatus, and to provide an improved automatic telephone answering apparatus which can release the telephone line from its busy state as soon as the line is disconnected at the remote controlling substation, even when the answering apparatus is in the midst of reproducing previously recorded incoming messages from callers.

Another object of the present invention is to provide an automatic telephone answering apparatus which can feed the recorded tape at a high speed until it comes to the end of the messages, and then restore or reset the entire apparatus so that it is prepared for the next call.

BRIEF DESCRIPTION OF THE DRAWING

The FIGURE is a block diagram of a preferred embodiment of the invention.

DETAILED DESCRIPTION OF A PREFERRED EMBODIMENT

When a ringing signal arrives at the present apparatus, the signal is detected at a ringing signal detector 1. The output signal of the detector actuates an operation holding means 2 which keeps the present automatic telephone answering apparatus in receiving condition. If the ringing signal continues for three minutes or more, for example, the holding means with its internal switches now closed will supply power to each part of this apparatus. Holding means 2 provides an instruction signal to actuate an answer word transmitter 3 which transmits a series of answer words to the calling subscriber. The end of the transmission of the answer words is detected by an answer word end detector 4. The output signal of the answer word end detector 4 actuates a message signal recorder 5, which in turn actuates a tape driving means 6. As a result of these operations, the message transmitted from a calling subscriber and received at message receiver 7 is recorded on a recording tape.

As an ordinary calling subscriber does not have any remote control signal transmitter for controlling the present automatic telephone answering apparatus from a remote station, a remote control signal detector 8 does not detect any signal, so that no output appears at the output of AND gate 9. The absence of a signal at the output of AND gate 9 permits a NOT circuit 10 to provide an output signal. Therefore, an AND gate 11 provides an output signal to a timer 12 as soon as holding means 2 begins to operate. That is, holding means 2 and the timer begin to operate at the same time. The timer produces an output signal about two minutes later, for example. The output signal of timer 12, appearing about two minutes later than the arrival of the ringing signal, passes through an OR gate 13 and becomes an input to a reset or restoration means 14 which, when energized, resets holding means 2, so that the entire automatic telephone message recording apparatus is restored and waits for the receipt of the next ringing signal.

Next, there will be described the operation of this apparatus when its owner, from a remote location, controls the apparatus through a telephone line, in order to listen to the recorded incoming messages from calling subscribers. When the owner rings his own telephone substation associated with the answering apparatus, the series of answer words are sent back to him in the same manner as described above for ordinary calling subscribers. The end of transmission of the answer words is detected by the end of transmission detector 4, and the detector provides an output signal. Hearing the answer words, the owner sends a remote control signal which is detected at the remote control signal detector 8. The output signal from the detector 8 can now pass through AND gate 9 already opened by the signal from the detector 4. Therefore, the signal is removed from the output of NOT circuit 10, so that timer 12 stops running, whereby the timer does not produce any output signal, even after the predetermined time (for example, two minutes) elapses.

On the other hand, the output signal of the AND gate 9 actuates a rewinding means 15 to set the tape driving means 6 in its rewinding position, whereby the tape on which the incoming messages are already recorded is rewound to its initial position, whereupon a tape start point detecting means 16 operates to produce an output signal which is fed to a reproducer 17. The reproducer 17 then sets the tape driving means 6 in its reproducing mode to reproduce the previously recorded messages from calling subscribers. The messages are sent through the telephone line to the remote station where the owner of the answering apparatus is located. When the reproduction of the messages is completed, a reproduction end detector 18 detects this condition and produces an output signal. This signal passes through the OR gate 13 and becomes an input to the restoration means 14. As mentioned above, the restoration means 14 then resets the holding means 2, so that all the means are restored to their initial conditions and prepared for the receipt of the next ringing signal.

Next, the operation of the present apparatus will be described under the assumption that the owner of the apparatus hangs up his receiver in the midst of the remote play-back operation. The operation for playing back and listening to the messages is the same as described above; i.e., by sending the remote control signal. If the owner of the answering apparatus hangs up his receiver at the remote location before the reproducing operation is completed, either of the following two situations will occur:

1. The apparatus may receive one of several different signals; or
2. The apparatus receives no signal.

More specifically, when used in conjunction with the type of telephone switching system controlled by the calling subscriber, the present apparatus will receive a so-called PCP signal (calling party control signal), which is generated at the moment when the line is disconnected. In some other systems, the signal may be a dial tone of a continuous signal having a predetermined frequency, or a busy tone of a regularly interrupted signal having a given frequency. However, in some systems, the apparatus may receive no signal. In any of the cases mentioned above, the presence or absence of the particular disconnect signals may be detected by a suitable well-known means.

In the present apparatus, recognition of these situations is accomplished by a hang-up detector 19 which will produce an output signal when it detects a hanged-up condition of the receiver of the calling substation. This output signal is applied to one input of AND gate 20. To the other input of the gate is applied an output signal from a NOT circuit 21 which produces an output when no signal appears at the output of the reproduction end detector 18. Consequently, an output signal from AND gate 20 actuates a receipt rejecting means 22 whose output instruction signal disables the ringing signal detector 1 so as to prevent it from receiving any further ringing signals. The output signal of the receipt rejecting means 22 is also applied to the holding means 2, so that switches provided therein for completing the communication path are opened, and the telephone line is released from its busy condition. The output signal of AND gate 20 is also applied to tape quick driving means 23, so that the recording tape is driven at a high speed with the aid of reproducer 17.

When all of the messages left by the ordinary calling subscribers and recorded on the tape are completely reproduced, play-back end detector 18 detects the situation and produces an output which is applied through OR gate 13 to reset means 14 in order to actuate it, so that all the means of the apparatus are released. Simultaneously with this reset operation, the playback end detector 18 also delivers its output to NOT circuit 21 to remove its output signal, whereby AND gate 20 no longer supplies an actuating signal to the receipt rejecting means 22. Therefore, the rejecting means stops its operation, thereby returning the ringing signal detector 1 to a state ready for the reception of another ringing signal. Furthermore, when the output signal of AND gate 20 disappears, quick feeding means 23 also stops its operation.

As mentioned above, according to the present invention, the recorded message tape is played back in response to a remote control signal from the owner of the automatic telephone answering apparatus, and if the line loop at the remote controlling side is opened for any reason in the midst of reproduction of the recorded messages, the telephone line is immediately released from its busy state, and, simultaneously, the recording tape is driven at a high speed until it comes to the position where the next recording is possible. During this time interval, the automatic telephone answering apparatus inhibits the reception of any ringing signals which may occur. Therefore, the reliability of the apparatus is increased, and unnecessary holding of the telephone line in a busy state is avoided.

We claim:

1. In an automatic telephone answering apparatus connected to a telephone line and located at a first telephone substation, and including holding means responsive to an incoming ringing signal for holding the telephone line in a busy state, transmitter means for sending a previously recorded answer message to a calling party, tape recorder means for recording the calling party's incoming message, reproducing means for reproducing the recorded incoming messages, remote control means responsive to a control code from a second telephone substation connected to said telephone line for operating said reproducing means and transmitting the reproduced messages to said second substation, reproduction-end detector means for producing an end signal when all of the incoming messages have been reproduced, and reset means responsive to said end signal for releasing said holding means and placing the telephone line in a non-busy state, the improvement comprising:

a. hang-up detector means for detecting a disconnection of said second substation from the telephone line during the operation of said reproducing means and for producing a disconnect signal indicative of said disconnection;

b. ringing signal rejection means responsive to said disconnect signal and for blocking receipt of any further incoming ringing signals; and c. fast drive means responsive to said disconnect signal for driving said tape recording means in a fast-forward mode until said reproduction-end detector means produces said end signal to produce said non-busy state.

2. The improvement as defined in claim 1 further comprising logic circuit means responsive to the coincidence of said disconnect and end signals to terminate said disconnect signal so that said holding means is permitted to receive further incoming ringing signals.

* * * * *